Aug. 13, 1929.  E. A. NELSON  1,724,302
CONNECTING ROD
Filed Aug. 15, 1927
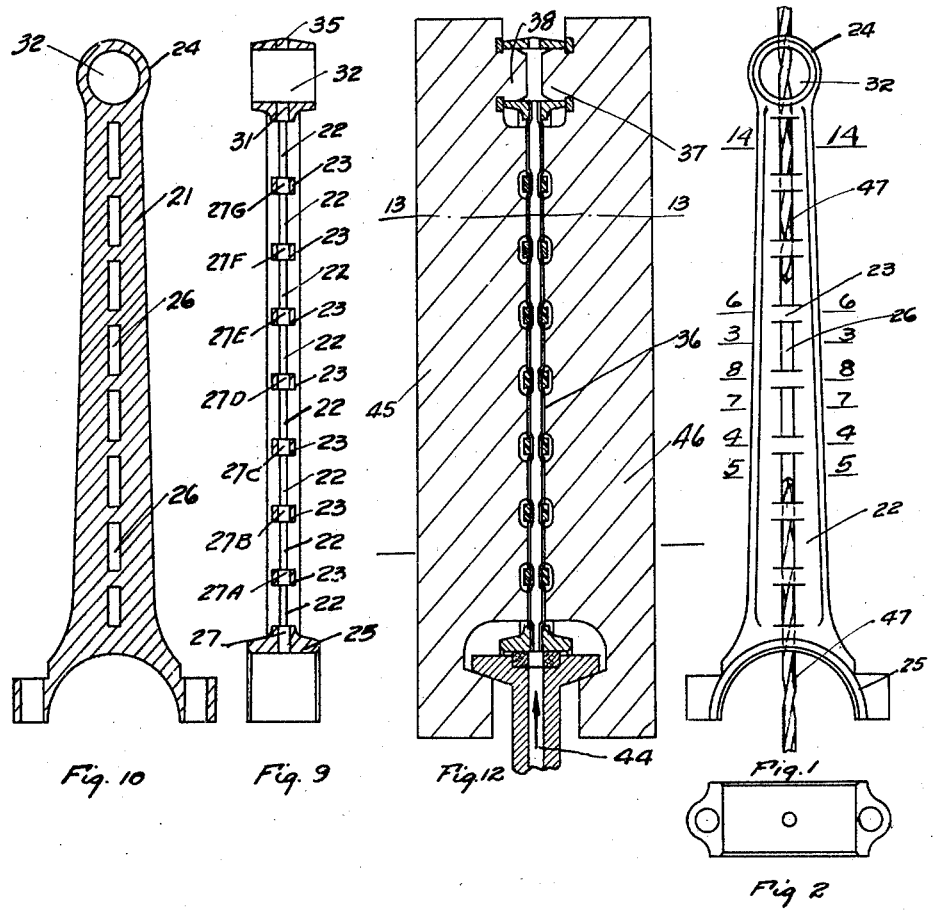
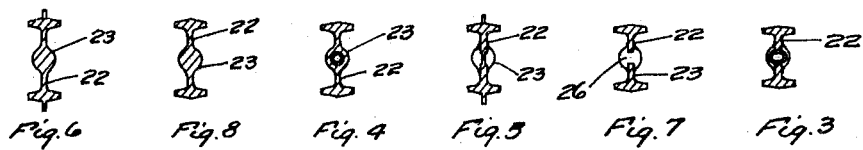
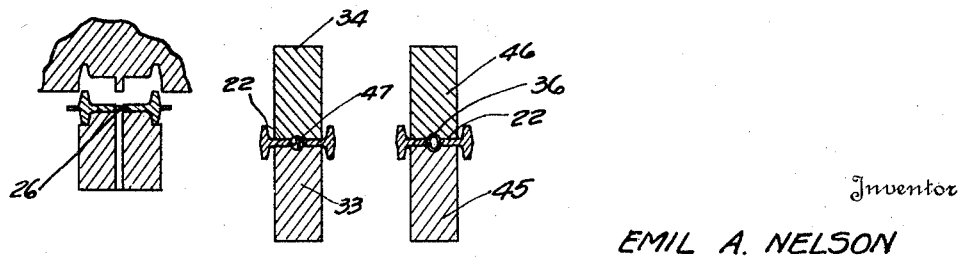
Inventor
EMIL A. NELSON
By John G. ...
Attorney Patented Aug. 13, 1929.

1,724,302

UNITED STATES PATENT OFFICE.

EMIL A. NELSON, OF DETROIT, MICHIGAN.

CONNECTING ROD.

Application filed August 15, 1927. Serial No. 213,165.

This invention relates to connecting rods for internal combustion engines and has for its object the insertion of an oil duct between the crank pin and wrist pin ends thereof that will be rigidly and permanently anchored in the rod.

Lubricating communication between opposite end bearings of a connecting rod is usually provided in one of two ways, viz, one long continuous hole is drilled through the web, or a separate tube is attached to one side of the web by means of clips and screws or rivets.

This invention provides a method whereby apertures for the insertion of an oil duct can be established, without the necessity for drilling a long small hole, and thereafter fixing in place, by expansion, a tube or duct providing lubricating communication between the bearings in the opposite ends of the rod. In this manner I avoid the usual clips and extra pieces that might shake loose and cause damage.

These and other objects and the several novel features of method and construction embodying my invention are hereinafter more fully described and claimed and shown in preferred form in the accompanying drawings in which, Fig. 1 is a view of a connecting rod of conventional external appearance showing drills performing drilling operation.

Fig. 2 is an end view of Fig. 1.

Fig. 3 is a section taken on line 3—3 of Fig. 1 with expanded duct in place.

Fig. 4 is a section taken on line 4—4 of Fig. 1 showing the tube passing through a boss.

Fig. 5 is a section taken on line 5—5 of Fig. 1 showing rough forging before punching slots and trimming off the "flash".

Fig. 6 is a section taken on line 6—6 of Fig. 1 showing rough forging before trimming off the "flash".

Fig. 7 is a section taken on line 7—7 of Fig. 1 showing the forging after punching slots and trimming off the "flash", but before the drilling operation.

Fig. 8 is a section taken on line 8—8 of Fig. 1 showing the forging after trimming off the "flash".

Fig. 9 is a longitudinal section of the rod at right angles to the web after the drilling operation and ready for the insertion of the tube.

Fig. 10 is a longitudinal section of the rod through the web, after the slots have been punched and the "flash" trimmed off, but before the drilling operation.

Fig. 11 depicts one means for simultaneously trimming off the flash and punching the slots.

Fig. 12 is a view in section showing the oil duct in place while being expanded between sealing and restraining dies, also incorporating a method for applying the expanding fluid pressure.

Fig. 13 is a section taken on line 13—13 of Fig. 12 showing the web of the rod in section, with the tube expanded out into the impressions in the restraining dies.

Fig. 14 is a section taken on line 14—14 of Fig. 1 and shows the drill being guided by the slots and the jig pieces.

In the drawings, 21 illustrates a connecting rod of conventional appearance, having an I beam cross section as depicted in the various figures, with a wrist pin end at 24 and a crank pin end at 25 with the web 22 extending between and interconnecting them.

In my construction a series of bosses 23 are formed, in the original forging, projecting above the surface of the web 22 on both sides thereof, and between these bosses 23, the web 22 is cut away in the form of slots as shown at 26. The width of the slots 26 is substantially equal to the external diameter of the duct tube 36, and the number of bosses 23 is determined by the length of the rod, the bosses 23 being spaced longitudinally of the rod web at intervals sufficiently close to insure proper support for the duct tube. The slots extend in length from boss to boss and are preferrably punched from the web in the same operation that the "flash" of the forging is removed as shown in Fig. 11.

After the bearing hole in the crank pin portion 25 has been finished to the desired dimensions, and after the wrist pin portion has been finished to the desired hole diameter as at 32, a series of holes 27, 27A, 27B, 27C, 27D, 27E, 27F and 27G through the bosses 23 and the hole 31 in the portion 24 are drilled as shown in Fig. 1. The width of the slots 26 are by preference the same diameter as the drilled holes just mentioned, which means that, in the spaces between successive holes, the drill or drills 47 will be supported and kept in line by the long edges of the holes. To further guide the drill or drills, which of necessity must be long though drilling only at short intervals in the bosses 23, a jig or fixture is provided as shown in Fig. 14, the jig being in two portions 33 and 34 applied from opposite sides of the web 22, the two portions being accurately dowelled to insure perfect registration. The combination of this drill jig and the edges of the slots 26 assures an accurate and complete guide for the long drill or drills with no danger of running out or cutting through.

In many connecting rods where a long and continuous hole is drilled through the web from end to end, much difficulty is encountered, because such a long drill is not guided or directed tends to "run". Also the drill gets hot from lack of ventilation and inability to get cutting compound to the cutting edges. In my method, the drill only cuts for a short distance while passing through a boss 23 while being firmly guided close to the cutting edges. The cutting edges have an opportunity to cool between bosses, there is no opportunity for chips to accumulate, and it is possible to keep the cutting edges always bathed with cutting compound. All of these items make for fast, economical and accurate work with little or no danger of spoilage during this operation as in the case of the single long hole.

According to my method it is entirely feasible to employ two drills working from opposite ends by also drilling the extra hole in the portion 24 as at 35, thus halving the time required yet with assurance that the holes would all be in line.

After these holes are drilled, a tube or duct 36 of proper length and suitable material is inserted through the series of holes. The wrist pin end 24 is then blocked off and made oil tight by the portions 37 and 38 of the fixtures 45 and 46, see Fig. 12. If double drilling has been employed, the hole 35 can be tapped and plugged to make it tight. The restraining dies 45—46 are cut away as shown in Fig. 12 to clear the bosses 23, otherwise drawing up hard against the web 22, and adjacent the slots 26 these dies carry impressions forming elliptical openings, the long diameter of each opening being somewhat greater than the original diameter of the inserted tube 36, see Fig. 13.

When the foregoing arrangement has been made, hydrostatic pressure is applied to the interior of the duct 36 through the orifice 44, which pressure causes the tube 36 to expand out into the elliptical impressions in the dies 45—46 while maintaining its original size and form where it passes through the bosses 23 at the end holes 27 and 31. This expansion of the tube 36 brings about a very tight sealing fit in all of the holes through which the tube 26 passes, and when the pressure is released, the tube 36 will be securely and permanently anchored in place in the rod, forming a continuous, firmly located and oil tight communicating passage between the two bearing ends of the rod. Subsequently, the wrist pin bushing (not shown) can be inserted and the crank pin bearing (not shown) can be applied and the rod assembled in the usual manner.

It will be evident to one skilled in the art, that these various jigs, tools and fixtures are simple, economical to prepare and easy to operate, and where production requirements are large, their cost and operation will effect a great saving over the older methods.

It will now be evident that I have devised a new and useful construction while disclosing a method for economically and accurately producing same. Obviously changes in detail and method can be made by one skilled in the art without departing from the spirit of the invention, so I do not care to limit myself to the specific embodiment shown.

What I claim is:

1. A connecting rod having bearing supports in opposite ends thereof, a web interconnecting said supports, said web being provided with alternate slots and bosses, and a tube passing along said slots and through said bosses establishing a duct between said supports.

2. A connecting rod having bearing supports in opposite ends thereof with a web interconnecting said supports, said web being provided with alternate slots and bosses, and a tube passing along said slots and through said bosses, said tube being expanded to a non-circular form along said slots establishing a duct between said supports.

3. A connecting rod having a wrist pin end portion and a crank pin end portion with a web interconnecting said portions, a plurality of bosses in longitudinally spaced relation along said web, said web being provided with longitudinally disposed slots between adjacent bosses and between said end portions and the bosses adjacent thereto, said bosses and said end portions being provided with apertures in line with each other and with said slots, and a tube passing through said apertures.

4. A connecting rod having a wrist pin portion and a crank pin portion with a web connecting said portions, a plurality of bosses in longitudinally spaced relation along said web, said web being provided with longitudinally disposed slots intermediate said bosses, said bosses and said portions being provided with apertures in line with each other and with said slots, and a tube passing through said apertures and along said slots, said tube being sealed by expansion in said apertures.

5. A connecting rod having bearing supports on opposite ends thereof with a web connecting said supports, a plurality of bosses on said web in longitudinally spaced relation, and said web being provided with slots between adjacent bosses, said slots providing guides for directing a drill through said bosses.

6. In a connecting rod having bearing supports at opposite ends thereof and a connecting web, thickened portions on said web spaced from each other and extending lengthwise of said rod, said portions being provided with aligned openings therein for the reception of a tube, and a limited portion of said web between said portions being removed.

7. A connecting rod having bearing supports at opposite ends thereof and a web connecting the same, said web being provided with a row of spaced openings therein extending between said supports, those portions of said web between said openings being provided with aligned openings, and a tube extending between said supports confined in the last mentioned openings.

Dated at Detroit, Michigan, August 12, 1927.

EMIL A. NELSON.